US010572285B2

(12) United States Patent
Jian

(10) Patent No.: US 10,572,285 B2
(45) Date of Patent: Feb. 25, 2020

(54) METHOD AND APPARATUS FOR ELASTICALLY SCALING VIRTUAL MACHINE CLUSTER

(71) Applicant: BEIJING BAIDU NETCOM SCIENCE AND TECHNOLOGY CO., LTD., Beijing (CN)

(72) Inventor: Hengyi Jian, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 128 days.

(21) Appl. No.: 15/429,342

(22) Filed: Feb. 10, 2017

(65) Prior Publication Data
US 2018/0027061 A1    Jan. 25, 2018

(30) Foreign Application Priority Data
Jul. 20, 2016 (CN) .......................... 2016 1 0575356

(51) Int. Cl.
*G06F 15/173* (2006.01)
*G06F 9/455* (2018.01)
(Continued)

(52) U.S. Cl.
CPC .......... *G06F 9/45558* (2013.01); *G06F 21/53* (2013.01); *G06F 21/57* (2013.01);
(Continued)

(58) Field of Classification Search
CPC ...... G06F 9/45558; G06F 21/53; G06F 21/57; G06F 2009/4557; G06F 2009/45587;
(Continued)

(56) References Cited

U.S. PATENT DOCUMENTS 8,762,531 B1 *  6/2014  Yemini ................. G06Q 10/06
                                            709/226
2014/0101316 A1 *  4/2014  Lee ....................... G06F 9/5072
                                            709/226

(Continued)

FOREIGN PATENT DOCUMENTS

CN    103577271 A  *  2/2014
CN    103577271 A     2/2014

*Primary Examiner* — Sm A Rahman
(74) *Attorney, Agent, or Firm* — Miller, Matthias & Hull LLP

(57) ABSTRACT

The present application discloses a method and apparatus for elastically scaling a virtual machine cluster. A specific implementation of the method includes: calculating a first amount of residual resources of virtual machines in a virtual machine cluster during service deployment; acquiring an amount of resources demanded by a service to be deployed; acquiring a configuration level of the virtual machines in the virtual machine cluster; determining a virtual machine having a predetermined configuration level as a target virtual machine based on whether the first amount of residual resources satisfies the amount of resources demanded; and deploying the service to be deployed to the target virtual machine. This implementation can implement service deployment in a virtual machine cluster including virtual machines having different configuration levels and also can implement the deployment of different services on a single virtual machine, thereby reducing the costs of service deployment and improving the resource utilization rate of the virtual machine cluster.

17 Claims, 6 Drawing Sheets

(51) Int. Cl.
  *G06F 21/53* (2013.01)
  *H04L 12/24* (2006.01)
  *H04L 29/08* (2006.01)
  *G06F 21/57* (2013.01)
  *H04L 9/08* (2006.01)
  *H04L 9/14* (2006.01)
  *H04L 9/30* (2006.01)
  *H04L 29/06* (2006.01)

(52) U.S. Cl.
  CPC .............. *H04L 9/0869* (2013.01); *H04L 9/14* (2013.01); *H04L 9/30* (2013.01); *H04L 41/0893* (2013.01); *H04L 63/045* (2013.01); *H04L 67/1008* (2013.01); *G06F 2009/45587* (2013.01); *G06F 2221/034* (2013.01)

(58) Field of Classification Search
  CPC ... G06F 2221/034; H04L 9/0869; H04L 9/14; H04L 9/30; H04L 41/0893; H04L 41/5054; H04L 63/045; H04L 67/10; H04L 67/1008; H04L 67/34
  USPC ......................................................... 709/226
  See application file for complete search history.

(56) References Cited

U.S. PATENT DOCUMENTS

| | | | |
|---|---|---|---|
| 2014/0149493 A1* | 5/2014 | Acer | H04W 4/60 709/203 |
| 2016/0216991 A1* | 7/2016 | Ansari | G06F 9/45558 |
| 2017/0207947 A1* | 7/2017 | Marom | H04L 41/046 |

* cited by examiner

METHOD AND APPARATUS FOR ELASTICALLY SCALING VIRTUAL MACHINE CLUSTER

CROSS-REFERENCE TO RELATED APPLICATION

This application claims the priority of Chinese Patent Application No. 201610575356.7, entitled "Method and Apparatus for Elastically Scaling Virtual Machine Cluster," filed on Jul. 20, 2016, the content of which is incorporated herein by reference in its entirety.

TECHNICAL FIELD

The present application relates to the field of computer technology, specifically to the field of Internet technology, and more specifically to a method and apparatus for elastically scaling a virtual machine cluster.

BACKGROUND

Elastic scaling of a virtual machine cluster refers to adding virtual machines to the cluster or replacing original virtual machines with highly configured virtual machines, or removing virtual machines from the cluster or replacing original virtual machines with lowly configured virtual machines as required, so as to reduce the costs of the entire virtual machine cluster, and improve the input-output ratio of the virtual machine cluster.

In the prior art, virtual machines in a virtual machine cluster have completely the same configuration level, and the elastic scaling of the cluster is generally implemented by monitoring the status of the cluster and adaptively adjusting the number of virtual machines in the cluster. For example, a new virtual machine is added to the cluster when it is detected that an indicator such as CPU usage, memory usage, and network traffic of the virtual machine exceeds a threshold, and a virtual machine is released from the cluster when it is detected that the above-mentioned indicator exceeds another threshold.

However, the above-mentioned technology of elastically scaling a virtual machine cluster based on monitoring has the following problems: since a delay is introduced due to monitoring, no virtual machine can be added to or removed from the cluster until monitoring data is collected and the collected monitoring data reaches a threshold. In addition, the creation of a new virtual machine takes some time, resulting in a long delay of the entire scaling process. In addition, virtual machines of the same structure have the same configuration level, making it difficult to maximize the resource utilization rate of virtual machines through the deployment of mixed service.

SUMMARY

An objective of the present application is to provide an improved method and apparatus for elastically scaling a virtual machine cluster, so as to solve the technical problems mentioned in the Background section.

According to a first aspect, the present application provides a method for elastically scaling a virtual machine cluster, the method comprising: calculating a first amount of residual resources of virtual machines in a virtual machine cluster during service deployment; acquiring an amount of resources demanded by a service to be deployed; acquiring a configuration level of the virtual machines in the virtual machine cluster; determining a virtual machine having a predetermined configuration level as a target virtual machine based on whether the first amount of residual resources satisfies the amount of resources demanded; and deploying the service to be deployed to the target virtual machine.

In some embodiments, the determining a virtual machine having a predetermined configuration level as a target virtual machine based on whether the first amount of residual resources satisfies the amount of resources demanded comprises: selecting one of the virtual machines having a highest configuration level as the target virtual machine in response to the first amount of residual resources satisfying the amount of resources demanded; or selecting one of the virtual machines having a lowest configuration level from the virtual machine cluster as a reference virtual machine and determining the target virtual machine based on whether the reference virtual machine has the highest configuration level, in response to the first amount of residual resources not satisfying the amount of resources demanded.

In some embodiments, the determining the target virtual machine based on whether the reference virtual machine has the highest configuration level comprises: applying for a virtual machine having a lowest configuration level satisfying the amount of resources demanded, adding the virtual machine applied for to the virtual machine cluster, and using the virtual machine applied for as the target virtual machine, in response to the configuration level of the reference virtual machine being the highest configuration level; or calculating, after upgrading the configuration level of the reference virtual machine, a second amount of residual resources of the virtual machine, and determining the target virtual machine based on whether the second amount of residual resources satisfies the amount of resources demanded, in response to the configuration level of the reference virtual machine being not the highest configuration level.

In some embodiments, the determining the target virtual machine based on whether the second amount of residual resources satisfies the amount of resources demanded comprises: applying for a virtual machine having an upgraded configuration level, migrating a service on the reference virtual machine to the virtual machine applied for, releasing the reference virtual machine, adding the virtual machine applied for to the virtual machine cluster, and using the virtual machine applied for as the target virtual machine, in response to the second amount of residual resources satisfying the amount of resources demanded; or applying for a virtual machine having a lowest configuration level satisfying the amount of resources demanded, adding the virtual machine applied for to the virtual machine cluster, and using the virtual machine applied for as the target virtual machine, in response to the second amount of residual resources not satisfying the amount of resources demanded.

In some embodiments, the selecting one of the virtual machines having the highest configuration level as the target virtual machine in response to the first amount of residual resources satisfying the amount of resources demanded comprises: selecting, if the number of virtual machines having the highest configuration level is greater than one, a virtual machine having the smallest amount of residual resources among the virtual machines having the highest configuration level as the target virtual machine, in response to the first amount of residual resources satisfying the amount of resources demanded.

In some embodiments, the selecting one of the virtual machines having a lowest configuration level from the virtual machine cluster as a reference virtual machine comprises: selecting, if the number of virtual machines having the lowest configuration level in the virtual machine cluster is greater than one, a virtual machine having the smallest amount of residual resources among the virtual machines having the lowest configuration level as the reference virtual machine.

In some embodiments, the method further comprises the following virtual machine releasing step: selecting at least one virtual machine having the smallest amount of resources occupied from the virtual machine cluster as a virtual machine to be released; determining whether an amount of residual resources of another virtual machine in the virtual machine cluster other than the virtual machine to be released satisfies an amount of resources required for deploying a service that is on the virtual machine to be released; and if yes, migrating the service on the virtual machine to be released to the another virtual machine and releasing the virtual machine to be released.

In some embodiments, the selecting at least one virtual machine having the smallest amount of resources occupied from the virtual machine cluster as a virtual machine to be released comprises: if the number of virtual machines having the smallest amount of resources occupied is greater than one, selecting the virtual machine having the lowest configuration level among the virtual machines having the smallest amount of resources occupied as the virtual machine to be released.

In some embodiments, the method further comprises: repeatedly performing the virtual machine releasing step at a predetermined time interval.

According to a second aspect, the present application provides an apparatus for elastically scaling a virtual machine cluster, the apparatus comprising: a residual amount calculating unit for calculating a first amount of residual resources of virtual machines in a virtual machine cluster during service deployment; a demand acquiring unit for acquiring an amount of resources demanded by a service to be deployed; a level acquiring unit for acquiring a configuration level of the virtual machines in the virtual machine cluster; a target determining unit for determining a virtual machine having a predetermined configuration level as a target virtual machine based on whether the first amount of residual resources satisfies the amount of resources demanded; and a service deployment unit for deploying the service to be deployed to the target virtual machine.

In some embodiments, the target determining unit comprises: a first target determining subunit for selecting one of the virtual machines having a highest configuration level as the target virtual machine in response to the first amount of residual resources satisfying the amount of resources demanded; or a second target determining subunit for selecting one of the virtual machines having a lowest configuration level from the virtual machine cluster as a reference virtual machine and determining the target virtual machine based on whether the reference virtual machine has the highest configuration level, in response to the first amount of residual resources not satisfying the amount of resources demanded.

In some embodiments, the second target determining subunit is further used for: applying for a virtual machine having a lowest configuration level satisfying the amount of resources demanded, adding the virtual machine applied for to the virtual machine cluster, and using the virtual machine applied for as the target virtual machine, in response to the configuration level of the reference virtual machine being the highest configuration level; or calculating, after upgrading the configuration level of the reference virtual machine, a second amount of residual resources of the virtual machine, and determining the target virtual machine based on whether the second amount of residual resources satisfies the amount of resources demanded, in response to the configuration level of the reference virtual machine being not the highest configuration level.

In some embodiments, the second target determining subunit is further used for: applying for a virtual machine having an upgraded configuration level, migrating a service on the reference virtual machine to the virtual machine applied for, releasing the reference virtual machine, adding the virtual machine applied for to the virtual machine cluster, and using the virtual machine applied for as the target virtual machine, in response to the second amount of residual resources satisfying the amount of resources demanded; or applying for a virtual machine having a lowest configuration level satisfying the amount of resources demanded, adding the virtual machine applied for to the virtual machine cluster, and using the virtual machine applied for as the target virtual machine, in response to the second amount of residual resources not satisfying the amount of resources demanded.

In some embodiments, the first target determining subunit is further used for: selecting, if the number of virtual machines having the highest configuration level is greater than one, a virtual machine having the smallest amount of residual resources among the virtual machines having the highest configuration level as the target virtual machine, in response to the first amount of residual resources satisfying the amount of resources demanded.

In some embodiments, the second target determining subunit is further used for: selecting, if the number of virtual machines having the lowest configuration level in the virtual machine cluster is greater than one, a virtual machine having the smallest amount of residual resources among the virtual machines having the lowest configuration level as the reference virtual machine.

In some embodiments, the apparatus further comprises a virtual machine releasing unit, wherein the virtual machine releasing unit comprises: a target selection subunit for selecting at least one virtual machine having the smallest amount of resources occupied from the virtual machine cluster as a virtual machine to be released; a resource determining subunit for determining whether an amount of residual resources of another virtual machine in the virtual machine cluster other than the virtual machine to be released satisfies an amount of resources required for deploying a service that is on the virtual machine to be released; and a virtual machine releasing subunit for: if the amount of residual resources of the another virtual machine in the virtual machine cluster other than the virtual machine to be released satisfies the amount of resources required for deploying the service that is on the virtual machine to be released, migrating the service on the virtual machine to be released to the another virtual machine and releasing the virtual machine to be released.

In some embodiments, the target selection subunit is further used for: if the number of virtual machines having the smallest amount of resources occupied is greater than one, selecting the virtual machine having the lowest configuration level among the virtual machines having the smallest amount of resources occupied as the virtual machine to be released.

In some embodiments, the apparatus further comprises: a timed release unit for invoking the virtual machine releasing unit at a predetermined time interval to release a virtual machine.

The method and apparatus for elastically scaling a virtual machine cluster that are provided by the present application, by calculating a first amount of residual resources of virtual machines in a virtual machine cluster during service deployment, acquiring an amount of resources demanded by a service to be deployed, acquiring a configuration level of the virtual machines in the virtual machine cluster, determining a virtual machine having a predetermined configuration level as a target virtual machine based on whether the first amount of residual resources satisfies the amount of resources demanded, and finally deploying the service to be deployed to the target virtual machine, can implement service deployment in a virtual machine cluster comprising virtual machines having different configuration levels and also can implement the deployment of different services on a single virtual machine, thereby reducing the costs of service deployment and improving the resource utilization rate of the virtual machine cluster.

BRIEF DESCRIPTION OF THE DRAWINGS

Other features, purposes and advantages of the present application will become more apparent from a reading of the detailed description of the non-limiting embodiments, said description being given in relation to the accompanying drawings, among which.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
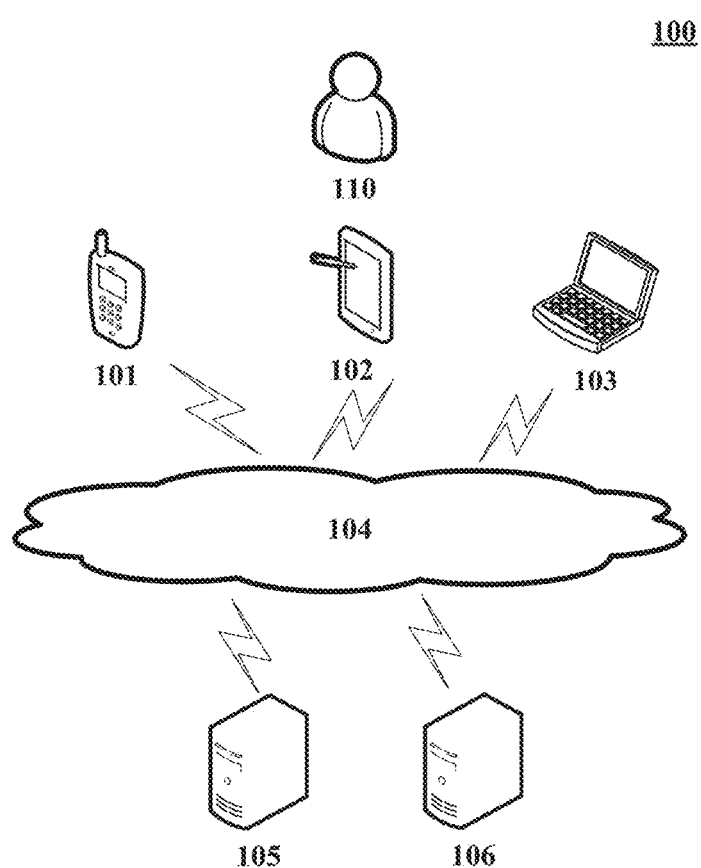
FIG. 1 is a diagram illustrating an exemplary system architecture to which the present application can be applied.

FIG. 1 shows an exemplary architecture of a system 100 which may be used by a method for elastically scaling a virtual machine cluster or an apparatus for elastically scaling a virtual machine cluster according to an embodiment of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the servers 105, 106 through the network 104, in order to transmit or receive messages, etc. Various communication client applications, such as web browser applications, shopping applications, search applications, instant messaging tools, mailbox clients, social platform software, may be installed on the terminal devices 101, 102 and 103.

The terminal devices 101, 102 and 103 may be various electronic devices capable of interacting with the server, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The servers 105 and 106 may be virtual machines in a virtual machine cluster providing various services, for example, virtual machines in the backend webpage virtual machine cluster provide support for displaying webpages on the terminal devices 101, 102 or 103. The backend webpage virtual machine cluster may perform a corresponding processing on data according to the received webpage request, and return a processing result (for example, webpage data) to the terminal devices.

It should be noted that the method for elastically scaling a virtual machine cluster according to the embodiments of the present application is generally executed by the virtual machine cluster including the virtual machines 105 and 106, and accordingly, an apparatus for elastically scaling a virtual machine cluster is generally installed on the virtual machine cluster including the virtual machines 105 and 106.

It should be appreciated that the numbers of the terminal devices, the networks and the virtual machines in the virtual machine cluster in FIG. 1 are merely illustrative. Any number of terminal devices, networks and virtual machines may be provided based on the actual requirements.

Figure 2:
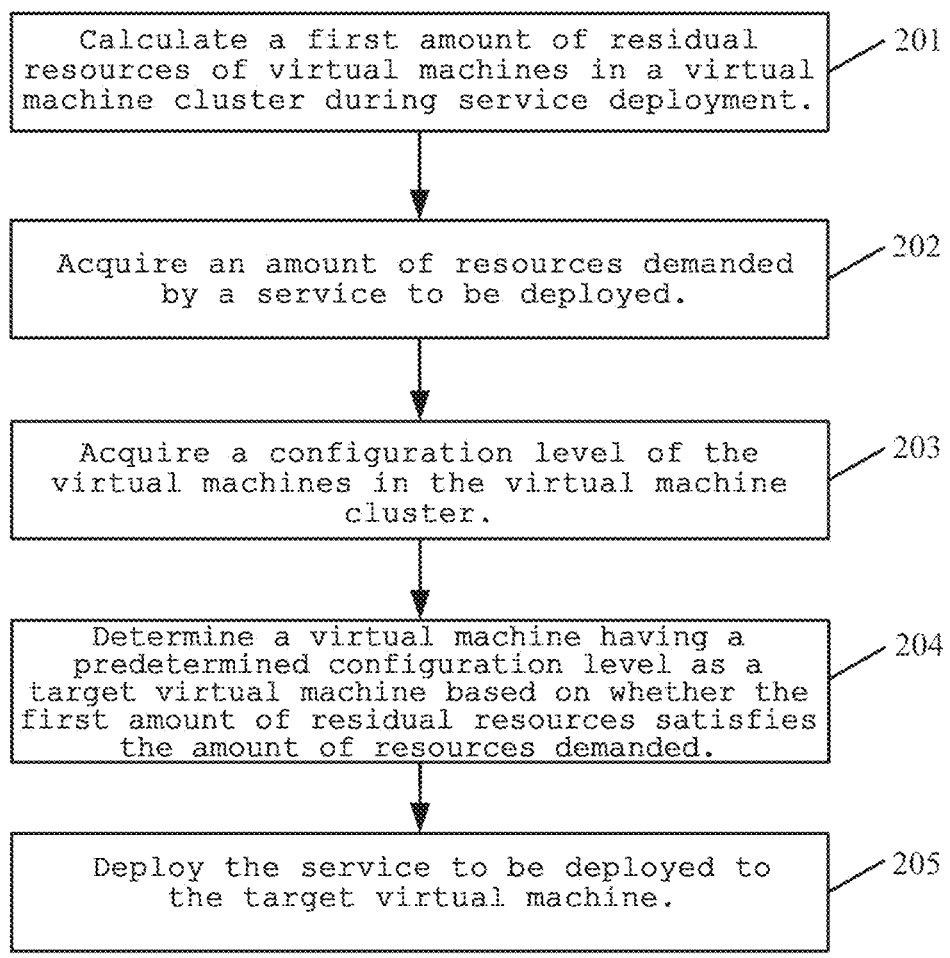
FIG. 2 is a flow chart of a method for elastically scaling a virtual machine cluster according to an embodiment of the present application.

Further, referring to FIG. 2, FIG. 2 shows a flow 200 of a method for elastically scaling a virtual machine cluster according to an embodiment of the present application. The method for elastically scaling a virtual machine cluster includes the following steps:

Step 201. Calculate a first amount of residual resources of virtual machines in a virtual machine cluster during service deployment.

In this embodiment, the virtual machine cluster may be a virtual machine cluster in a public cloud or a private cloud. The virtual machine cluster needs to use a virtual machine to deploy a service, and has an application programming interface (API) that can access, create, and release a virtual machine. Herein, the deployed service is stateless, that is, data may be stored in an external storage such as a database or object storage, but cannot be stored on a local magnetic disk.

During service deployment, to determine which virtual machines has a sufficient amount of residual resources to directly deploy a service, first, the amount of residual resources of the virtual machines in the virtual machine cluster needs to be calculated. Herein, the amount of residual resources equals the total amount of resources of the virtual machine minus the sum of resources required for deploying the service on the virtual machine, that is, the above-mentioned first amount of residual resources.

Step 202. Acquire an amount of resources demanded by a service to be deployed.

In this embodiment, during service deployment, to determine which virtual machines has a sufficient amount of residual resources to directly deploy a service, after the amount of residual resources of the virtual machines in the virtual machine cluster is calculated, an input budget for the amount of resources demanded by the service to be deployed needs to be further acquired, that is, the number of cores in a central processing unit (CPU) and the amount of memory in megabits (M) required by the service need to be acquired first.

Step 203. Acquire a configuration level of the virtual machines in the virtual machine cluster.

In this embodiment, the configuration levels of the virtual machines in the virtual machine cluster are a plurality of preset level, each level having a particular resource configuration (the number of cores in CPU, and the memory size. In addition, as the configuration level increases, the resource costs are reduced (costs per CPU core, or costs per megabit (M) of memory).

Herein, the acquiring a configuration level of the virtual machines in the virtual machine cluster is for the purpose of determining whether the virtual machine can be upgraded to a higher configuration level, and determining the configuration level to which the virtual machine should be upgraded, when the virtual machine can be upgraded to a higher configuration level.

Step 204. Determine a virtual machine having a predetermined configuration level as a target virtual machine based on whether the first amount of residual resources satisfies the amount of resources demanded.

In this embodiment, first, it is determined, based on whether the first amount of residual resources satisfies the amount of resources demanded, whether a new virtual machine needs to be applied for. If the first amount of residual resources satisfies the amount of resources demanded, the first amount of residual resources may be fully used for deploying the service. If the first amount of residual resources does not satisfy the amount of resources demanded, a new virtual machine needs to be applied for in order to deploy the service.

After it is determined whether a new virtual machine needs to be applied for, a virtual machine having a predetermined configuration level may be selected as a target virtual machine for service deployment according to actual requirements. Herein, the configuration levels of the virtual machines in the virtual machine cluster may be divided into multiple grades based on preset virtual machine configuration level grades. The grades correspond to different resource configuration levels (the number of CPU cores, and the memory size), and a higher configuration level indicates lower resource costs (costs per CPU core, and costs per megabit (M) of memory).

For example, if the first amount of residual resources satisfies the amount of resources demanded, a virtual machine having the lowest configuration level may be used as the target virtual machine so as to improve the resource utilization rate; or one of the virtual machines having the highest configuration level may be selected as the target virtual machine so as to reduce the possibility of migration of the service. Because the target virtual machine has the highest configuration level, the virtual machine does not need to be upgraded subsequently, thereby reducing the possibility of migration of the service.

For example, if the first amount of residual resources does not satisfy the amount of resources demanded, one of the virtual machines having the lowest configuration level is selected from the virtual machine cluster as a reference virtual machine, and the target virtual machine is determined based on whether the reference virtual machine has the highest configuration level, so as to improve the resource utilization rate After the reference virtual machine is determined, it is determined, based on whether the reference virtual machine is a virtual machine having the highest configuration level, whether the reference virtual machine can be upgraded to a virtual machine having a higher configuration level, and the target virtual machine is further determined based on the determining result.

For example, in response to that the configuration level of the reference virtual machine is the highest configuration level, the reference virtual machine cannot be upgraded to a higher-level virtual machine. In this case, a virtual machine having the lowest configuration level that satisfies the amount of resources demanded is applied for, the virtual machine applied for is added to the virtual machine cluster, and the virtual machine applied for is used as the target virtual machine. Optionally, if the number of virtual machines having the highest configuration level is greater than one, a virtual machine having the smallest amount of residual resources among the virtual machines having the highest configuration level may be selected as the target virtual machine, so as to further improve the resource utilization rate.

Alternatively, in response to that in response to that the configuration level of the reference virtual machine is not the highest configuration level, the reference virtual machine may be upgraded to a higher-level virtual machine. In this case, a second amount of residual resources of the virtual machine after upgrading the configuration level of the reference virtual machine may be calculated, the target virtual machine is determined based on whether the second amount of residual resources satisfies the amount of resources demanded. Optionally, if the number of virtual machines having the lowest configuration level in the virtual machine cluster is greater than one, a virtual machine having the smallest amount of residual resources among the virtual machines having the lowest configuration level may be selected as the reference virtual machine, so as to further improve the resource utilization rate.

Herein, the virtual machine obtained after upgrading the configuration level of the reference virtual machine is a newly applied virtual machine having a higher configuration level, and the service in the original virtual machine is migrated into the newly applied virtual machine. The second amount of residual resources refers to an amount of residual resources in the newly applied virtual machine after the service on the virtual machine is deployed.

Herein, the determining the target virtual machine based on whether the second amount of residual resources satisfies the amount of resources demanded may include at least one of the following two: applying for a virtual machine having an upgraded configuration level, migrating a service on the reference virtual machine to the virtual machine applied for, releasing the reference virtual machine, adding the virtual machine applied for to the virtual machine cluster, and using the virtual machine applied for as the target virtual machine, in response to that the second amount of residual resources satisfies the amount of resources demanded; applying for a virtual machine having the lowest configuration level that satisfies the amount of resources demanded, adding the virtual machine applied for to the virtual machine cluster, and using the virtual machine applied for as the target virtual machine, if the second amount of residual resources does not satisfy the amount of resources demanded.

Step 205. Deploy the service to be deployed to the target virtual machine.

In this embodiment, based on the target virtual machine determined at step 204, the service to be deployed may be deployed to the target virtual machine.

Herein, It should be appreciated by those skilled in the art that in the above-mentioned embodiment, the step of deploying the service to be deployed to the target virtual machine and the step of adding the virtual machine applied for to the virtual machine cluster not only may be performed in the same order as that described in the above-mentioned embodiment, but also may be performed concurrently or in the reverse order.

Figure 3:
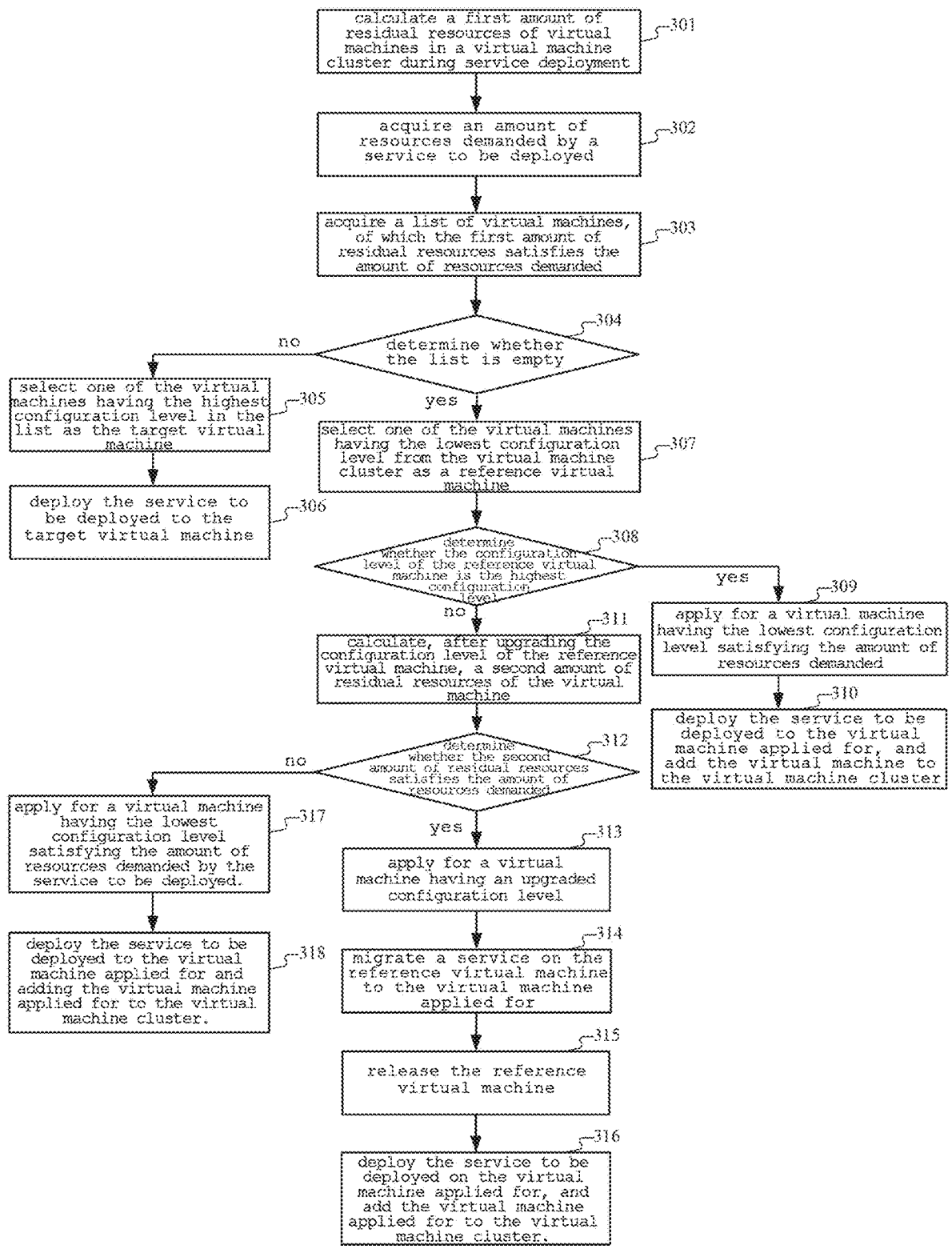
FIG. 3 is a flow chart of an application scenario of a method for elastically scaling a virtual machine cluster according to the present application.

Further, referring to FIG. 3, FIG. 3 shows a flow 300 of an application of the method for elastically scaling a virtual machine cluster. The flow 300 of the method for elastically scaling a virtual machine cluster includes the following steps:

At step 301, calculate a first amount of residual resources of the virtual machines in a virtual machine cluster during service deployment; then, perform step 302.

At step 302, acquire an amount of resources demanded by a service to be deployed; then, perform step 303.

At step 303, acquire a list of virtual machines, of which the first amount of residual resources satisfies the amount of resources demanded; then, perform step 304.

At step 304, determine whether the list is empty; if no, perform step 305; of yes, performing step 307.

At step 305, select one of the virtual machines having the highest configuration level in the list as the target virtual machine; then, perform step 306.

At step 306, deploy the service to be deployed to the target virtual machine.

At step 307, select one of the virtual machines having the lowest configuration level from the virtual machine cluster as a reference virtual machine; then, perform step 308.

At step 308, determine whether the configuration level of the reference virtual machine is the highest configuration level; if yes, perform step 309; if not, perform step 311.

At step 309, apply for a virtual machine having the lowest configuration level that satisfies the amount of resources demanded; then, perform step 310.

At step 310, deploy the service to be deployed to the virtual machine applied for, and add the virtual machine to the virtual machine cluster.

At step 311, calculate, after upgrading the configuration level of the reference virtual machine, a second amount of residual resources of the virtual machine; then, perform step 312.

At step 312, determine whether the second amount of residual resources satisfies the amount of resources demanded; if yes, perform step 313; if no, perform step 317.

At step 313, apply for a virtual machine having an upgraded configuration level; then, perform step 314.

At step 314, migrate a service on the reference virtual machine to the virtual machine applied for; then, perform step 315.

At step 315, release the reference virtual machine; then, perform step 316.

At step 316, deploy the service to be deployed on the virtual machine applied for, and add the virtual machine applied for to the virtual machine cluster.

At step 317, apply for a virtual machine having the lowest configuration level that satisfies the amount of resources demanded by the service to be deployed.

At step 318, deploy the service to be deployed to the virtual machine applied for and adding the virtual machine applied for to the virtual machine cluster.

In the above-mentioned application scenario, based on the acquired first amount of residual resources and the amount of resources demanded by the service to be deployed, the virtual machines of which the first amount of residual resources satisfies the amount of resources demanded can be obtained through calculation, and then statistics are collected for the virtual machines of which the first amount of residual resources satisfies the amount of resources demanded, to obtain a list of virtual machines of which the first amount of residual resources satisfies the amount of resources demanded. Then, attribute information of the list may be queried by using a query phrase. It is determined based on the returned search result, whether the list is empty. If the list is not empty, it indicates that there is currently a virtual machine that can satisfy the requirements for deploying the service in the current virtual machine cluster, and one of virtual machine having the highest configuration level may be selected from the list as the target virtual machine.

Herein, if the virtual machine can satisfy the resource demand of the service after the configuration level of the reference virtual machine is upgraded (which may be upgraded by one grade, two grades, or until the highest configuration level), a virtual machine obtained after the configuration level of the reference virtual machine is upgraded is applied for, all services on the original reference virtual machine are deployed on the new virtual machine applied for, and then release the original reference virtual machine. Finally, the service to be deployed is deployed to the newly applied virtual machine a having higher configuration level, and the virtual machine is added to the virtual machine cluster. Thus, the process ends. In this case, if the deployed service has multiple instances, the above-mentioned process may be executed for each instance.

If the configuration level of the reference virtual machine is already the highest configuration level (that is, the configuration levels of all the virtual machines in the cluster are the highest configuration level) or the resource demand of the service cannot be satisfied after upgrading the configuration level of the virtual machine, a virtual machine having the lowest configuration level that can satisfy the resource demand of the service is applied for, the service is deployed on the virtual machine applied for, and the virtual machine is added to the cluster. Thus, the process ends.

The method provided in the above-mentioned embodiment of the present application can implement service deployment in a virtual machine cluster including virtual machines having different configuration levels and also can implement the deployment of different services on a single virtual machine, thereby reducing the costs of service deployment and improving the resource utilization rate of the virtual machine cluster.

Figure 4:
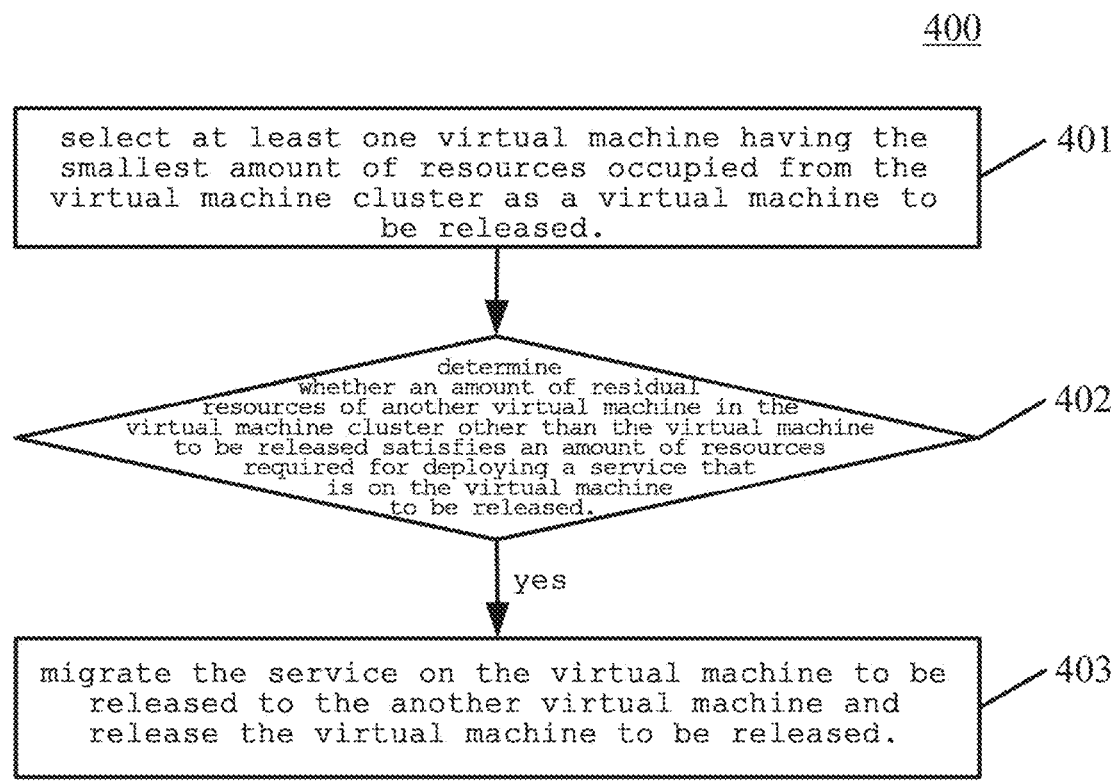
FIG. 4 is a flow chart of a method for releasing a virtual machine in the method for elastically scaling a virtual machine cluster according to an embodiment of the present application.

Further, referring to FIG. 4, FIG. 4 shows a flow 400 of a method for releasing a virtual machine in the method for elastically scaling a virtual machine cluster according to an embodiment. The flow 400 of the method for releasing a virtual machine includes the following steps:

At step 401, select at least one virtual machine having the smallest amount of resources occupied from the virtual machine cluster as a virtual machine to be released.

At step 402, determine whether an amount of residual resources of another virtual machine in the virtual machine cluster other than the virtual machine to be released satisfies an amount of resources required for deploying a service that is on the virtual machine to be released.

At step 403, if the amount of residual resources of the another virtual machine in the virtual machine cluster other than the virtual machine to be released satisfies the amount of resources required for deploying the service that is on the virtual machine to be released, migrate the service on the virtual machine to be released to the another virtual machine and release the virtual machine to be released.

In this embodiment, when a user needs to delete a service, the control system of the virtual machine cluster may directly delete the service from the virtual machine on which the service is deployed. However, at this time, no change is made to the virtual machine (the virtual machine will not be released).

During virtual machine releasing, a virtual machine having the smallest amount of resources occupied (the amount of resources occupied equals the sum of resources required for deploying the service on the virtual machine) is first selected from the cluster.

If the residual resources of other virtual machines are insufficient for deploying the service that is on the virtual machine, that is, the services on the virtual machine cannot be all migrated to another virtual machine, the timed task is ended.

If the residual resources of another virtual machine is sufficient for deploying the service that is on the virtual machine, all services on the virtual machine are migrated to the another virtual machine, and the virtual machine is released.

In some optional implementations of this embodiment, the selecting at least one virtual machine having the smallest amount of resources occupied from the virtual machine cluster as a virtual machine to be released may include: if the number of virtual machines having the smallest amount of resources occupied is greater than one, selecting the virtual machine having the lowest configuration level among the virtual machines having the smallest amount of resources occupied as the virtual machine to be released.

In some optional implementations of this embodiment, the above-mentioned virtual machine releasing step may further include: repeatedly performing the virtual machine releasing step at a predetermined time interval. That is, the virtual machine releasing operation is performed regularly, for example, once per hour or per day. The above-mentioned timed execution task is repeated until no virtual machine can be released.

The method for releasing a virtual machine according to the above-mentioned embodiment of the present application can select, regularly from the virtual machine cluster, a virtual machine that can be released, and release the virtual machine, thereby improving the virtual machine releasing efficiency and improving the resource utilization rate of the virtual machine cluster.

Figure 5:
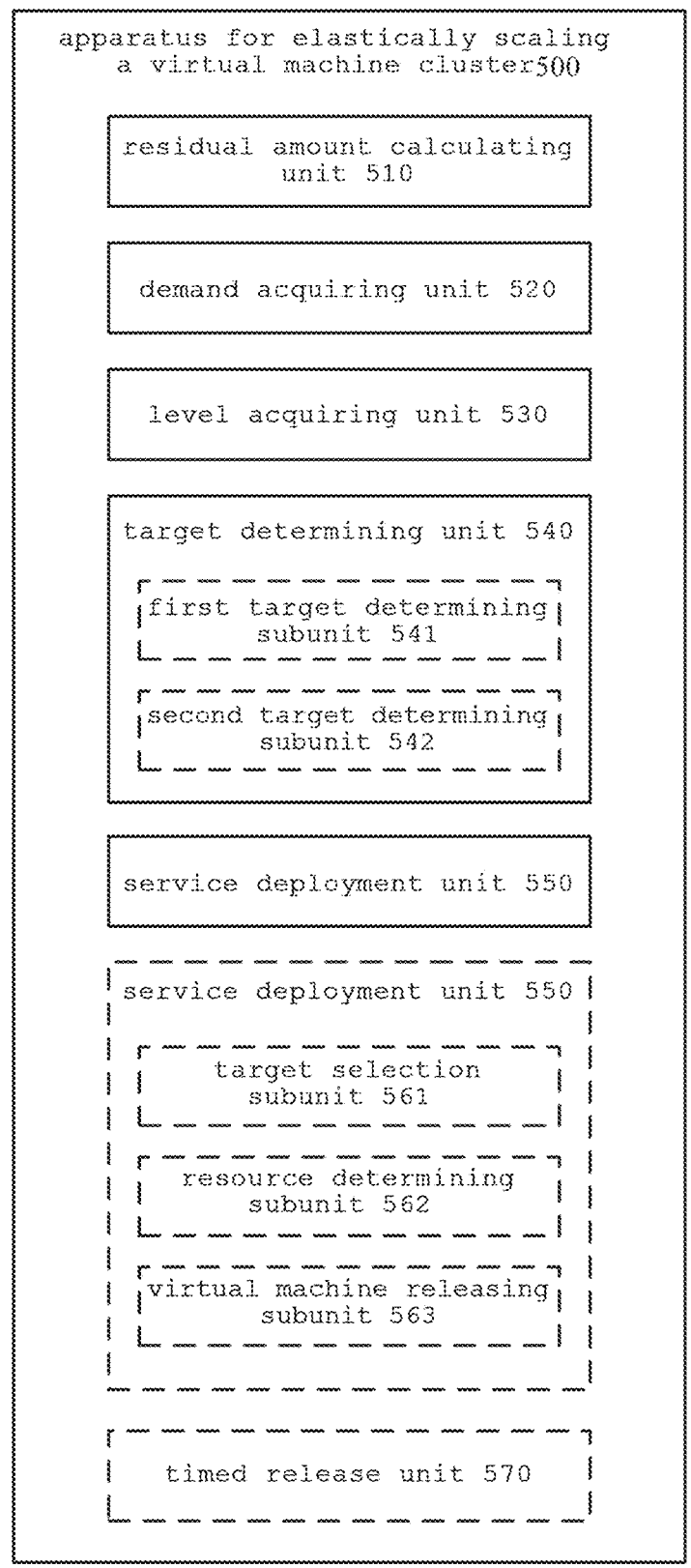
FIG. 5 is a schematic structural diagram of an apparatus for elastically scaling a virtual machine cluster according to an embodiment of the present application.

Further, referring to FIG. 5, as an implementation of the methods shown in the above-mentioned figures, the present application provides an embodiment of an apparatus for elastically scaling a virtual machine cluster. This apparatus embodiment corresponds to the method embodiment shown in FIG. 2. The apparatus may be specifically applied to various electronic devices.

As shown in FIG. 5, the apparatus 500 for elastically scaling a virtual machine cluster according to this embodiment may include, but not limited to, a residual amount calculating unit 510, a demand acquiring unit 520, a level acquiring unit 530, a target determining unit 540, and a service deployment unit 550.

The residual amount calculating unit 510 is used for calculating a first amount of residual resources of the virtual machines in a virtual machine cluster during service deployment. The demand acquiring unit 520 is used for acquiring an amount of resources demanded by a service to be deployed. The level acquiring unit 530 is used for acquiring a configuration level of the virtual machines in the virtual machine cluster. The target determining unit 540 is used for determining a virtual machine having a predetermined configuration level as a target virtual machine based on whether the first amount of residual resources satisfies the amount of resources demanded. The service deployment unit 550 is used for deploying the service to be deployed to the target virtual machine.

In some optional implementations of this embodiment, the target determining unit may include, but not limited to: a first target determining subunit 541, for selecting one of the virtual machines having the highest configuration level as the target virtual machine in response to that the first amount of residual resources satisfies the amount of resources demanded; or a second target determining subunit 542, for selecting one of the virtual machines having the lowest configuration level from the virtual machine cluster as a reference virtual machine and determining the target virtual machine based on whether the reference virtual machine has the highest configuration level, in response to that the first amount of residual resources does not satisfy the amount of resources demanded.

In some optional implementations of this embodiment, the second target determining subunit is further used for: applying for a virtual machine having the lowest configuration level that satisfies the amount of resources demanded, adding the virtual machine applied for to the virtual machine cluster, and using the virtual machine applied for as the target virtual machine, in response to that the configuration level of the reference virtual machine is the highest configuration level; or calculating, after upgrading the configuration level of the reference virtual machine, a second amount of residual resources of the virtual machine, and determining the target virtual machine based on whether the second amount of residual resources satisfies the amount of resources demanded, in response to that the configuration level of the reference virtual machine is not the highest configuration level.

In some optional implementations of this embodiment, the second target determining subunit is further used for: applying for a virtual machine having an upgraded configuration level, migrating a service on the reference virtual machine to the virtual machine applied for, releasing the reference virtual machine, adding the virtual machine applied for to the virtual machine cluster, and using the virtual machine applied for as the target virtual machine, in response to that the second amount of residual resources satisfies the amount of resources demanded; or applying for a virtual machine having the lowest configuration level that satisfies the amount of resources demanded, adding the virtual machine applied for to the virtual machine cluster, and using the virtual machine applied for as the target virtual machine, in response to that the second amount of residual resources does not satisfy the amount of resources demanded.

In some optional implementations of this embodiment, the first target determining subunit is further used for: selecting, if the number of virtual machines having the highest configuration level is greater than one, a virtual machine having the smallest amount of residual resources among the virtual machines having the highest configuration level as the target virtual machine, in response to that the first amount of residual resources satisfies the amount of resources demanded.

In some optional implementations of this embodiment, the second target determining subunit is further used for: selecting, if the number of virtual machines having the lowest configuration level in the virtual machine cluster is greater than one, a virtual machine having the smallest amount of residual resources among the virtual machines having the lowest configuration level as the reference virtual machine.

In some optional implementations of this embodiment, the apparatus may include, but not limited to, a virtual machine releasing unit 560. The virtual machine releasing unit may include, but not limited to: a target selection subunit 561 for selecting at least one virtual machine having the smallest amount of resources occupied from the virtual machine cluster as a virtual machine to be released; a resource determining subunit 562 for determining whether an amount of residual resources of another virtual machine in the virtual machine cluster other than the virtual machine to be released satisfies an amount of resources required for deploying a service that is on the virtual machine to be released; and a virtual machine releasing subunit 563, used for: if the amount of residual resources of the another virtual machine in the virtual machine cluster other than the virtual machine to be released satisfies the amount of resources required for deploying the service that is on the virtual machine to be released, migrating the service on the virtual machine to be released to the another virtual machine and releasing the virtual machine to be released.

In some optional implementations of this embodiment, the target selection subunit is further used for: if the number of virtual machines having the smallest amount of resources occupied is greater than one, selecting the virtual machine having the lowest configuration level among the virtual machines having the smallest amount of resources occupied as the virtual machine to be released.

In some optional implementations of this embodiment, the apparatus may include, but not limited to, a timed release unit 570 for invoking the virtual machine releasing unit at a predetermined time interval to release a virtual machine.

It should be appreciated by those skilled in the art that the above-mentioned apparatus for elastically scaling a virtual machine cluster 500 further includes other well-known structures, for example, a processor and a memory. Such well-known structures are not shown in FIG. 5 so as to not unnecessarily obscure the embodiments of the disclosure.

It should be appreciated that the unit 510 to the unit 550 recorded in the apparatus 500 respectively correspond to the steps in the method described with reference to FIG. 2, and the unit 560 and the unit 570 recorded in the apparatus 500 respectively correspond to the steps in the method described with reference to FIG. 4. Therefore, the operations and features that are described above for the method for elastically scaling a virtual machine cluster also apply to the apparatus 500 and the units included therein, and will not be repeatedly described here. The corresponding units in the apparatus 500 may cooperate with units in a terminal device and/or server to implement the solutions of the embodiments of the present application.

In the above-mentioned embodiments of the present application, the first amount of residual resources and the second amount of residual resources merely represent two different amounts of residual resources. It should be appreciated by those skilled in the art that the terms "first" and "second" do not constitute a particular limitation on the amount of residual resources.

In the above-mentioned embodiments of the present application, the first target determining subunit and the second target determining subunit merely represent two different target determining subunits that determine the source of virtual machine of the target virtual machine by using different methods. It should be appreciated by those skilled in the art that the terms "first" and "second" do not constitute a particular limitation on the target determining subunit.

Figure 6:
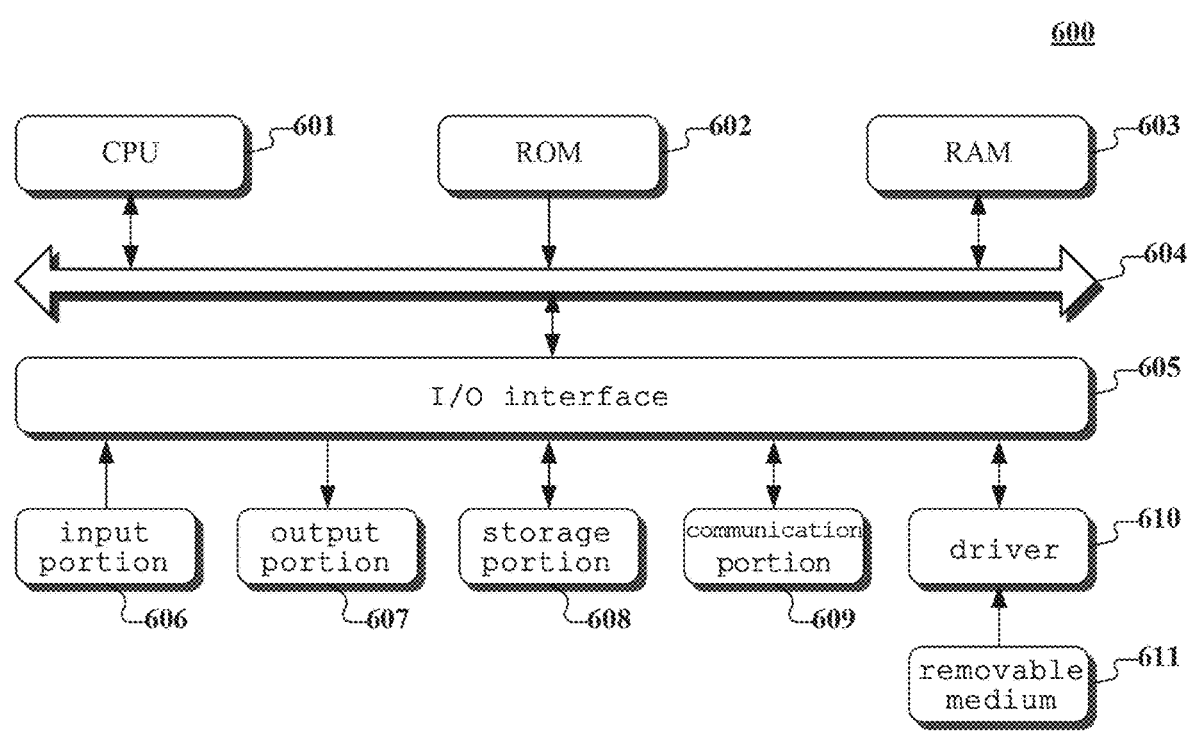
FIG. 6 is a schematic structural diagram of a computer system adapted to implement a terminal device or a server according to an embodiment of the present application.

Referring to FIG. 6, a schematic structural diagram of a physical computer system 600 adapted to implement a virtual machine server of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a residual amount calculating unit; a demand acquiring unit; a level acquiring unit; a target determining unit; and a service deployment unit, where the names of these units or modules are not considered as a limitation to the units. For example, the a residual amount calculating unit may also be described as "a unit for calculating a first amount of residual resources of virtual machines in a virtual machine cluster during service deployment."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: calculate a first amount of residual resources of virtual machines in a virtual machine cluster during service deployment; acquire an amount of resources demanded by a service to be deployed; acquire a configuration level of the virtual machines in the virtual machine cluster; determine a virtual machine having a predetermined configuration level as a target virtual machine based on whether the first amount of residual resources satisfies the amount of resources demanded; and deploy the service to be deployed to the target virtual machine.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for elastically scaling a virtual machine cluster, the method comprising: calculating a first amount of residual resources of virtual machines in a virtual machine cluster during service deployment; acquiring an amount of resources demanded by a service to be deployed; acquiring a configuration level of the virtual machines in the virtual machine cluster to determine whether the virtual machines are upgradable to a higher configuration level; determining a virtual machine having a predetermined configuration level as a target virtual machine based on whether the first amount of residual resources of the virtual machines in the virtual machine cluster satisfies the demanded amount of resources; wherein selecting at least one virtual machine having a smallest amount of resources occupied from the virtual machine cluster as a virtual machine to be released; determining whether an amount of residual resources of a second virtual machine in the virtual machine cluster other than the virtual machine to be released satisfies an amount of resources required for deploying the service on the virtual machine to be released; and if yes, migrating the service on the virtual machine to be released to the second virtual machine and releasing the virtual machine to be released; and deploying the service to be deployed to the target virtual machine.

2. The method according to claim 1, wherein the determining a virtual machine having a predetermined configuration level as a target virtual machine based on whether the first amount of residual resources satisfies the demanded amount of resources comprises: selecting one of the virtual machines having a highest configuration level as the target virtual machine in response to the first amount of residual resources satisfying the amount of resources demanded; or selecting one of the virtual machines having a lowest configuration level from the virtual machine cluster as a reference virtual machine and determining the target virtual machine based on whether the reference virtual machine has the highest configuration level, in response to the first amount of residual resources not satisfying the amount of resources demanded.

3. The method according to claim 2, wherein the determining the target virtual machine based on whether the reference virtual machine has the highest configuration level comprises: applying for a virtual machine having a lowest configuration level satisfying the amount of resources demanded, adding the virtual machine applied for to the virtual machine cluster, and using the virtual machine applied for as the target virtual machine, in response to the configuration level of the reference virtual machine being the highest configuration level; or calculating, after upgrading the configuration level of the reference virtual machine, a second amount of residual resources of the virtual machine, and determining the target virtual machine based on whether the second amount of residual resources satisfies the amount of resources demanded, in response to the configuration level of the reference virtual machine being not the highest configuration level.

4. The method according to claim 3, wherein the determining the target virtual machine based on whether the second amount of residual resources satisfies the amount of resources demanded comprises: applying for a virtual machine having an upgraded configuration level, migrating a service on the reference virtual machine to the virtual machine applied for, releasing the reference virtual machine, adding the virtual machine applied for to the virtual machine cluster, and using the virtual machine applied for as the target virtual machine, in response to the second amount of residual resources satisfying the amount of resources demanded; or applying for a virtual machine having a lowest configuration level satisfying the amount resources demanded, adding the virtual machine applied for to the virtual machine cluster, and using the virtual machine applied for as the target virtual machine, in response to the second amount of residual resources not satisfying the amount of resources demanded.

5. The method according to claim 2, wherein the selecting one of the virtual machines having the highest configuration level as the target virtual machine in response to the first amount of residual resources satisfying the amount of resources demanded comprises: selecting, if the number of virtual machines having the highest configuration level is greater than one, a virtual machine having a smallest amount of residual resources among the virtual machines having the highest configuration level as the target virtual machine, in response to the first amount of residual resources satisfying the amount of resources demanded.

6. The method according to claim 3, wherein the selecting one of the virtual machines having a lowest configuration level from the virtual machine cluster as a reference virtual machine comprises: selecting, if the number of virtual machines having the lowest configuration level in the virtual machine cluster is greater than one, a virtual machine having the smallest amount of residual resources among the virtual machines having the lowest configuration level as the reference virtual machine.

7. The method according to claim 1, wherein the selecting at least one virtual machine having a smallest amount resources occupied from the virtual machine duster as a virtual machine to be released comprises: it a number of virtual machines having the smallest amount of resources occupied is greater than one, selecting the virtual machine having the lowest configuration level among the virtual machines having the smallest amount of resources occupied as the virtual machine to be released.

8. The method according to claim 1, further comps sing: repeatedly performing the virtual machine releasing at a predetermined time interval.

9. An apparatus for elastically scaling a virtual machine duster, the apparatus comprising: at least one processor; and a memory storing instructions, which when executed by the at least one processor, cause the at least one processor to perform operations, the operations comprising: calculating a first amount of residual resources of virtual machines in a virtual machine cluster during service deployment; acquiring an amount of resources demanded by a service to be deployed; acquiring a configuration level of the virtual machines in the virtual machine cluster to determine whether the virtual machines are upgradable to a higher configuration level: determining a virtual machine having a predetermined configuration level as a target virtual machine based on whether the first amount of residual resources of the virtual machines in the virtual machine cluster satisfies the demanded amount of resources; wherein selecting at least one virtual machine having a smallest amount of resources occupied from the virtual machine cluster as a virtual machine to be released; determining whether an amount of residual resources of a second virtual machine in the virtual machine cluster other than the virtual machine to be released satisfies an amount of resources required for de loving the service on the virtual machine to be machine and releasing the virtual machine to be released and deploying the service to be deployed to the target virtual machine.

10. The apparatus according to claim 9, wherein the determining a virtual machine having a predetermined configuration level as a target virtual machine based on whether the first amount of residual resources satisfies the demanded amount of resources comprises: selecting one of the virtual machines having a highest configuration level as the target virtual machine in response to the first amount of residual resources satisfying the amount of resources demanded; or selecting one of the virtual machines having a lowest configuration level from the virtual machine cluster as a reference virtual machine and determining the target virtual machine based on whether the reference virtual machine has the highest configuration level, in response to the first amount of residual resources not satisfying the amount of resources demanded.

11. The apparatus according to claim 10, wherein the determining the target virtual machine based on whether the reference virtual machine has the highest configuration level comprises: applying for a virtual machine having a lowest configuration level satisfying the amount of resources demanded, adding the virtual machine applied for to the virtual machine cluster, and using the virtual machine applied for as the target virtual machine, in response to the configuration level of the reference virtual machine being the highest configuration level; or calculating, after upgrading the configuration level of the reference virtual machine, a second amount of residual resources of the virtual machine, and determining the target virtual machine based on whether the second amount of residual resources satisfies the amount of resources demanded, in response to the configuration level of the reference virtual machine being not the highest configuration level.

12. The apparatus according to claim 11, wherein the determining the target virtual machine based on whether the second amount of residual resources satisfies the amount of resources demanded comprises: applying for a virtual machine having an upgraded configuration level, migrating a service on the reference virtual machine to the virtual machine applied for, releasing the reference virtual machine, adding the virtual machine applied for to the virtual machine cluster, and using the virtual machine applied for as the target virtual machine, in response to the second amount of residual resources satisfying the amount of resources demanded; or applying for a virtual machine having a lowest configuration level satisfying the amount of resources demanded, adding the virtual machine applied for to the virtual machine cluster, and using the virtual machine applied for as the target virtual machine, in response to the second amount of residual resources not satisfying the amount of resources demanded.

13. The apparatus according to claim 10, wherein the selecting one of the virtual machines having the highest configuration level as the target virtual machine in response to the first amount of residual resources satisfying the amount of resources demanded comprises: selecting, if the number of virtual machines having the highest configuration level is greater than one, a virtual machine having the smallest amount of residual resources among the virtual machines having the highest configuration level as the target virtual machine, in response to the first amount residual resources satisfying the amount of resources demanded.

14. The apparatus according to claim 11, wherein the selecting one of the virtual machines having a lowest configuration level from the virtual machine cluster as a reference virtual machine comprises: selecting, if the number of virtual machines having the lowest configuration level in the virtual machine cluster is greater than one, a virtual machine having the smallest amount of residual resources among the virtual machines having the lowest configuration level as the reference virtual machine.

15. The apparatus according to claim 9, wherein the selecting at least one virtual machine having a smallest amount of resources occupied from the virtual machine duster as a virtual machine to be released comprises: if the number of virtual machines having the smallest amount of resources occupied is greater than one, selecting the virtual machine having the lowest configuration level among the virtual machines having the smallest amount of resources occupied as the virtual machine to be released.

16. The apparatus according to claim 9, the operations further comprising: repeatedly performing the virtual machine releasing at a predetermined time interval.

17. A non-transitory computer storage medium storing a computer program, which when executed by one or more processors, cause the one or more processors to perform operations, the operations comprising: calculating a first amount of residual resources of virtual machines in a virtual machine cluster during service deployment; acquiring an amount of resources demanded by a service to be deployed; acquiring a configuration level of the virtual machines in the virtual machine cluster to determine whether the virtual machines are upgradable to a higher configuration level; determining a virtual machine having a predetermined configuration level as a target virtual machine based on whether the first amount of residual resources of the virtual machines in the virtual machine cluster satisfies the demanded amount of resources; wherein selecting at least one virtual machine having a smallest amount of resources occupied from the virtual machine cluster as a virtual machine to be released: determining whether an amount of residual resources of a second virtual machine in the virtual machine cluster other than the virtual machine to be released satisfies an amount of resources required for deploying the service on the virtual machine to be released; and if yes, migrating the service on the virtual machine to be released to the second virtual machine and releasing the virtual machine to be released; and deploying the service to be deployed to the target virtual machine.

* * * * *